Aug. 22, 1939. C. J. RICE ET AL 2,170,507
HEATING SYSTEM
Filed May 3, 1935 6 Sheets-Sheet 3
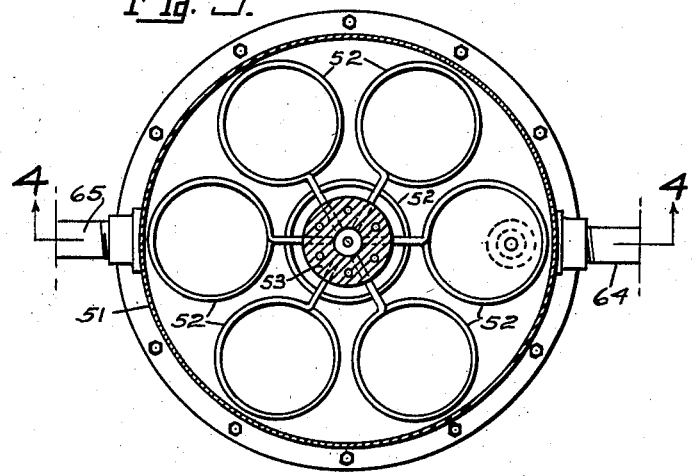
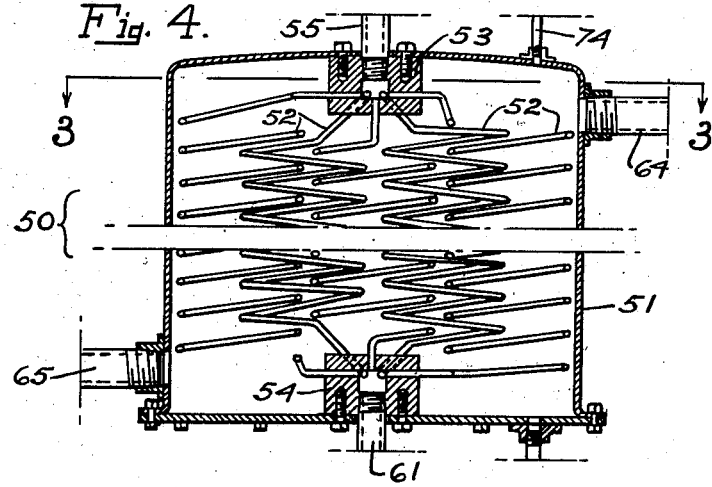
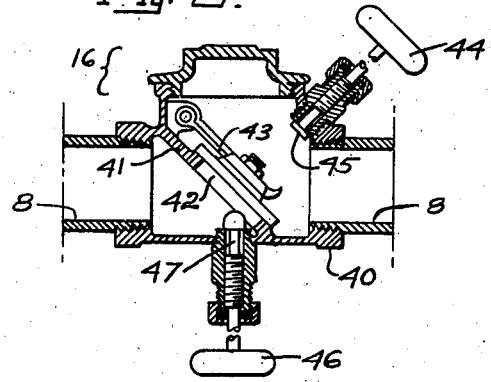
INVENTORS
CLARENCE J. RICE
VICTOR A. BERGHOEFER
BY
ATTORNEY.

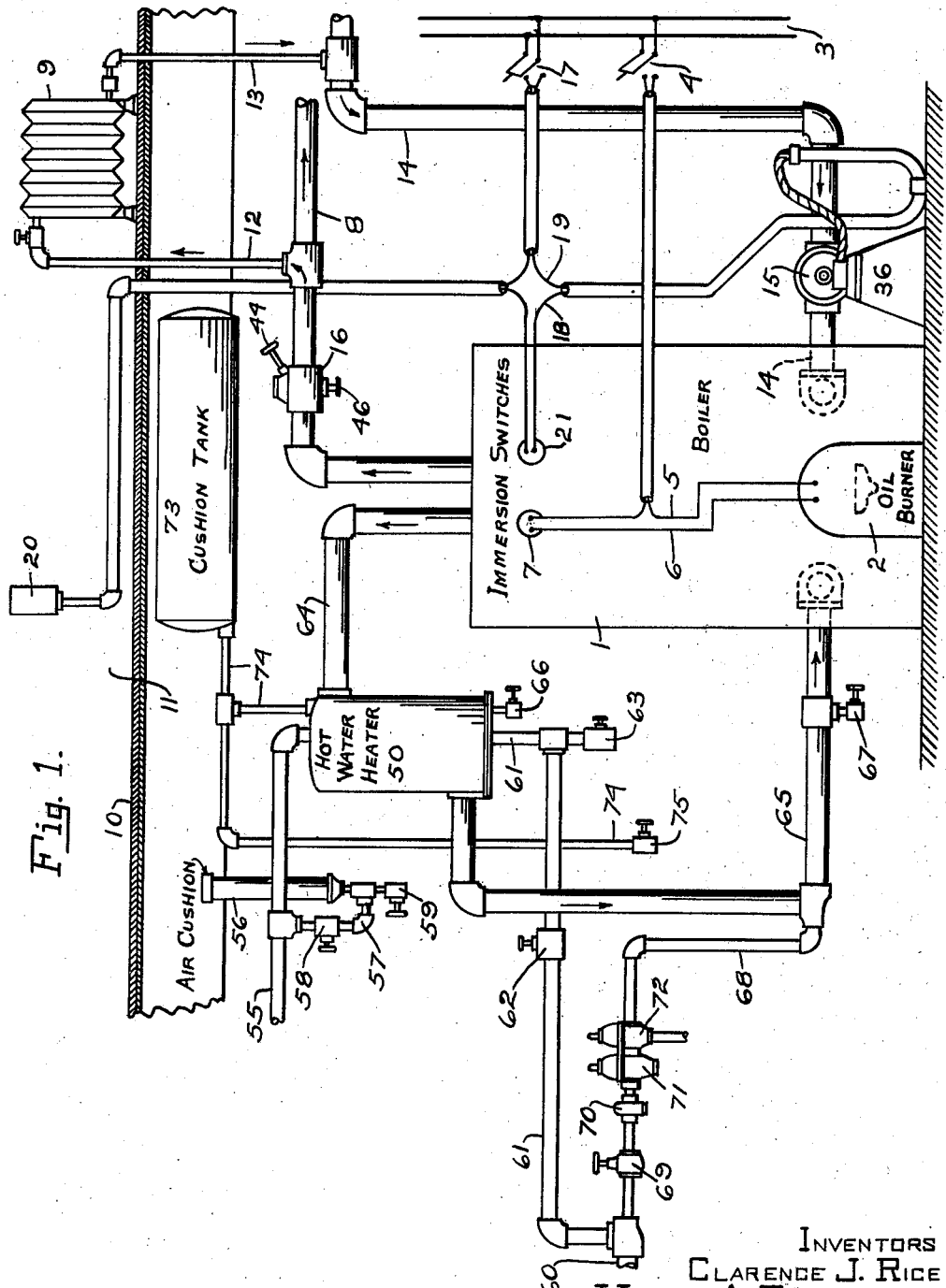

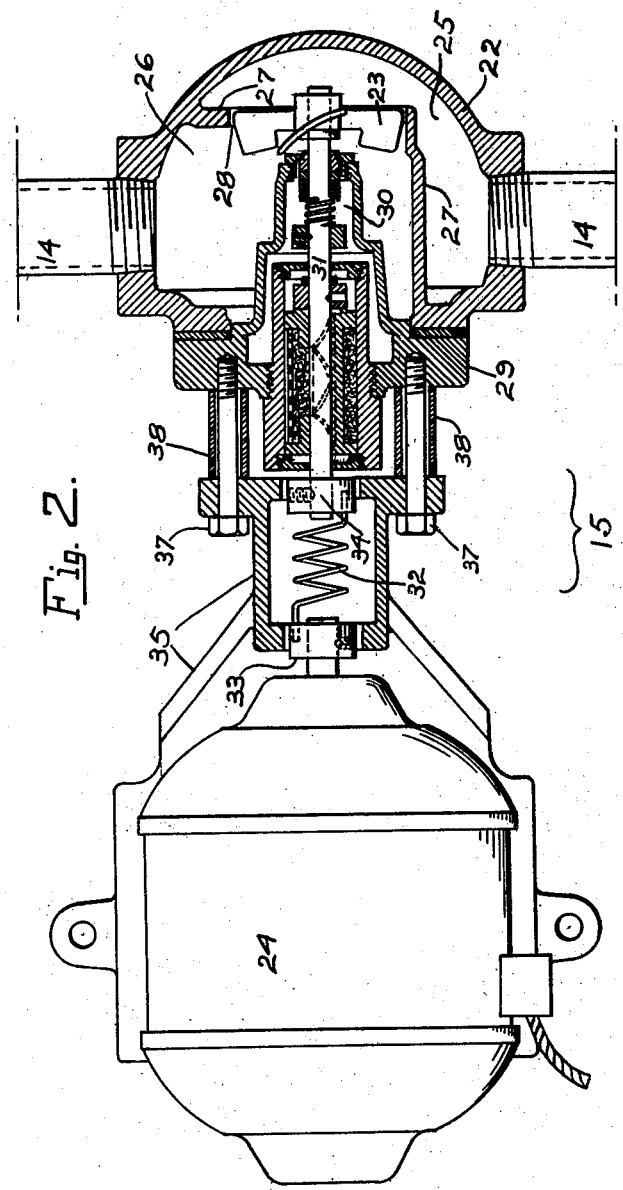

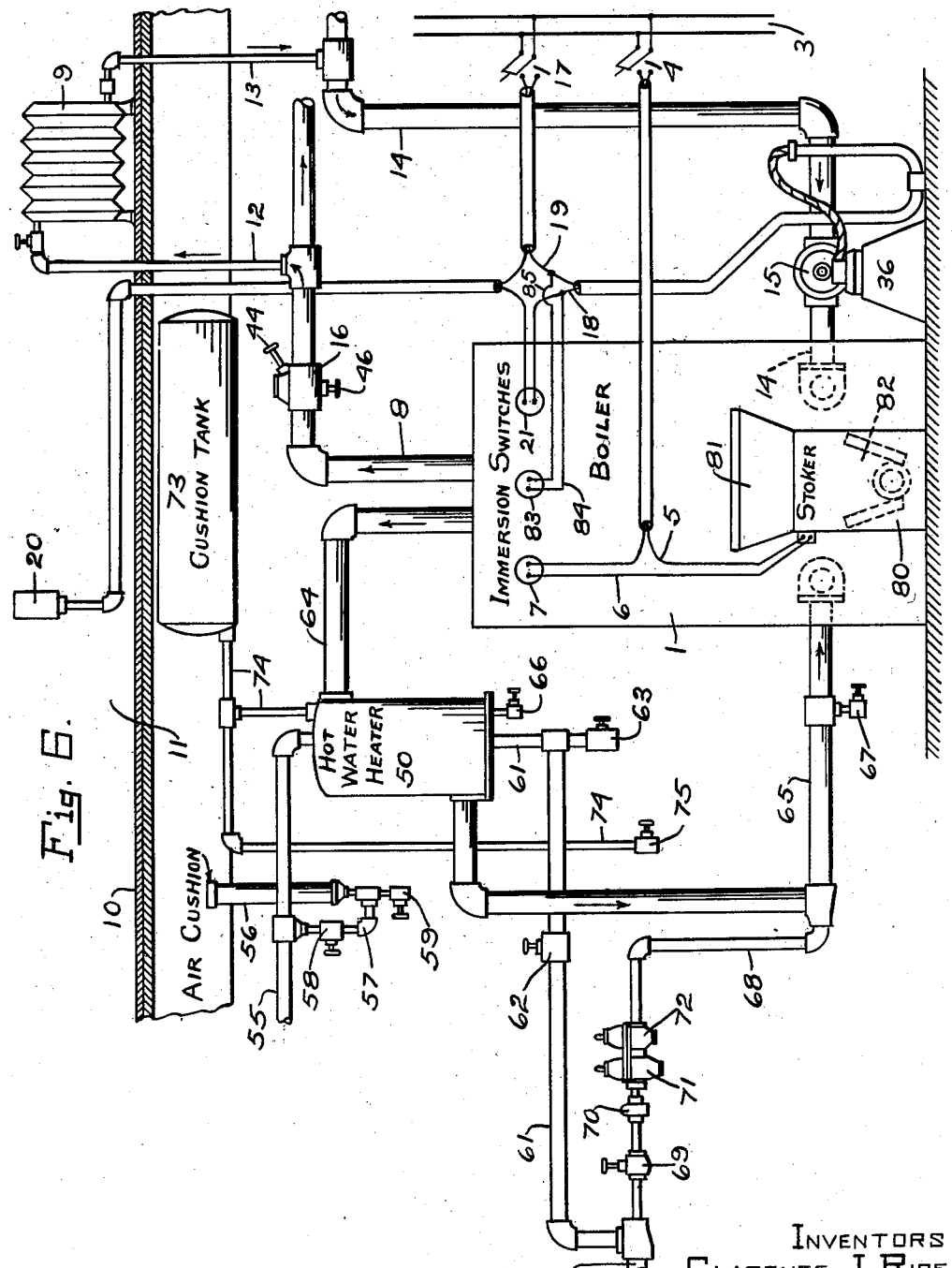

Aug. 22, 1939.  C. J. RICE ET AL  2,170,507
HEATING SYSTEM
Filed May 3, 1935  6 Sheets-Sheet 5
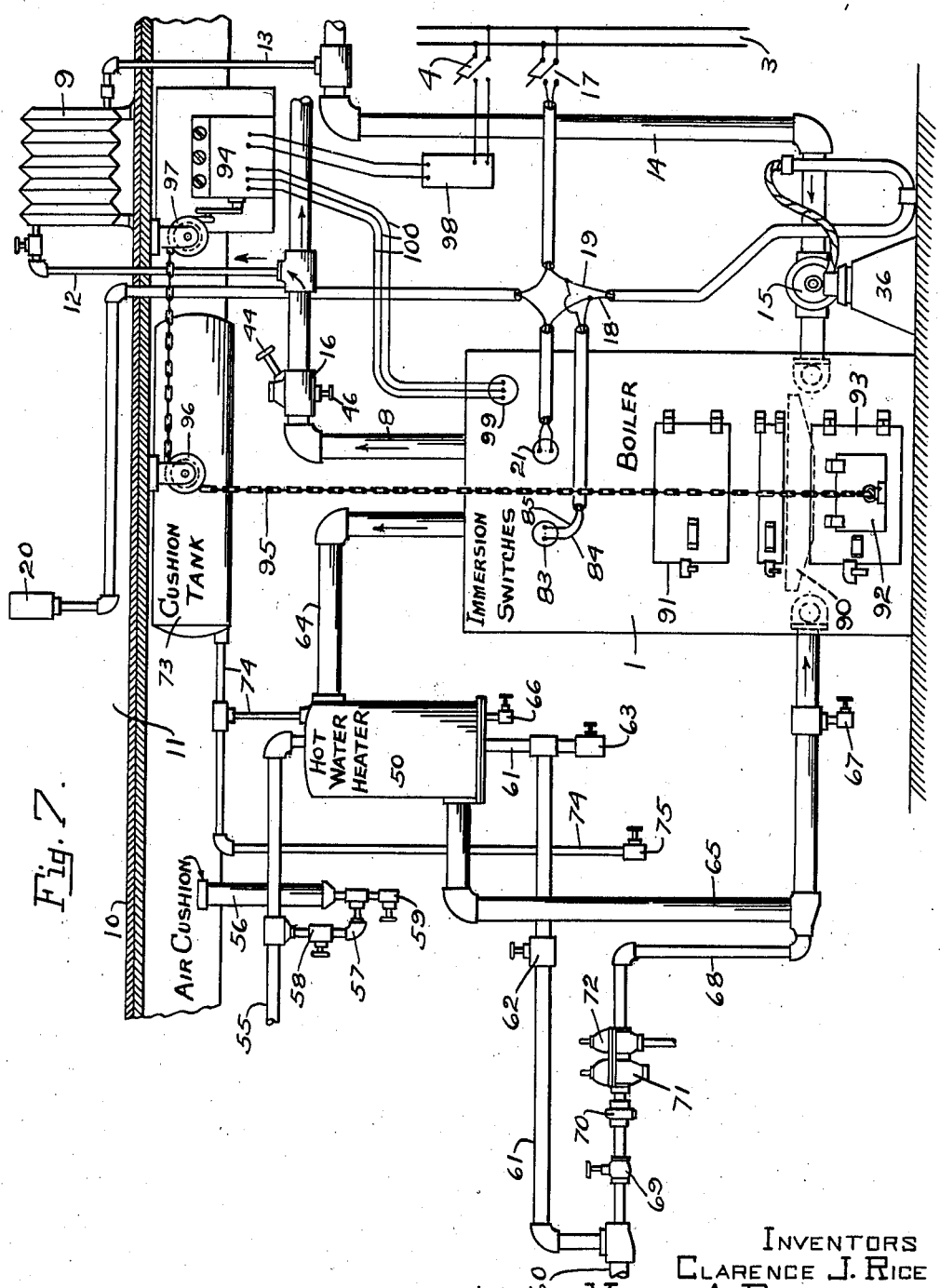
Fig. 7.
INVENTORS
CLARENCE J. RICE
VICTOR A. BERGHOEFER
BY
ATTORNEY.

Aug. 22, 1939.   C. J. RICE ET AL   2,170,507
HEATING SYSTEM
Filed May 3, 1935   6 Sheets-Sheet 6
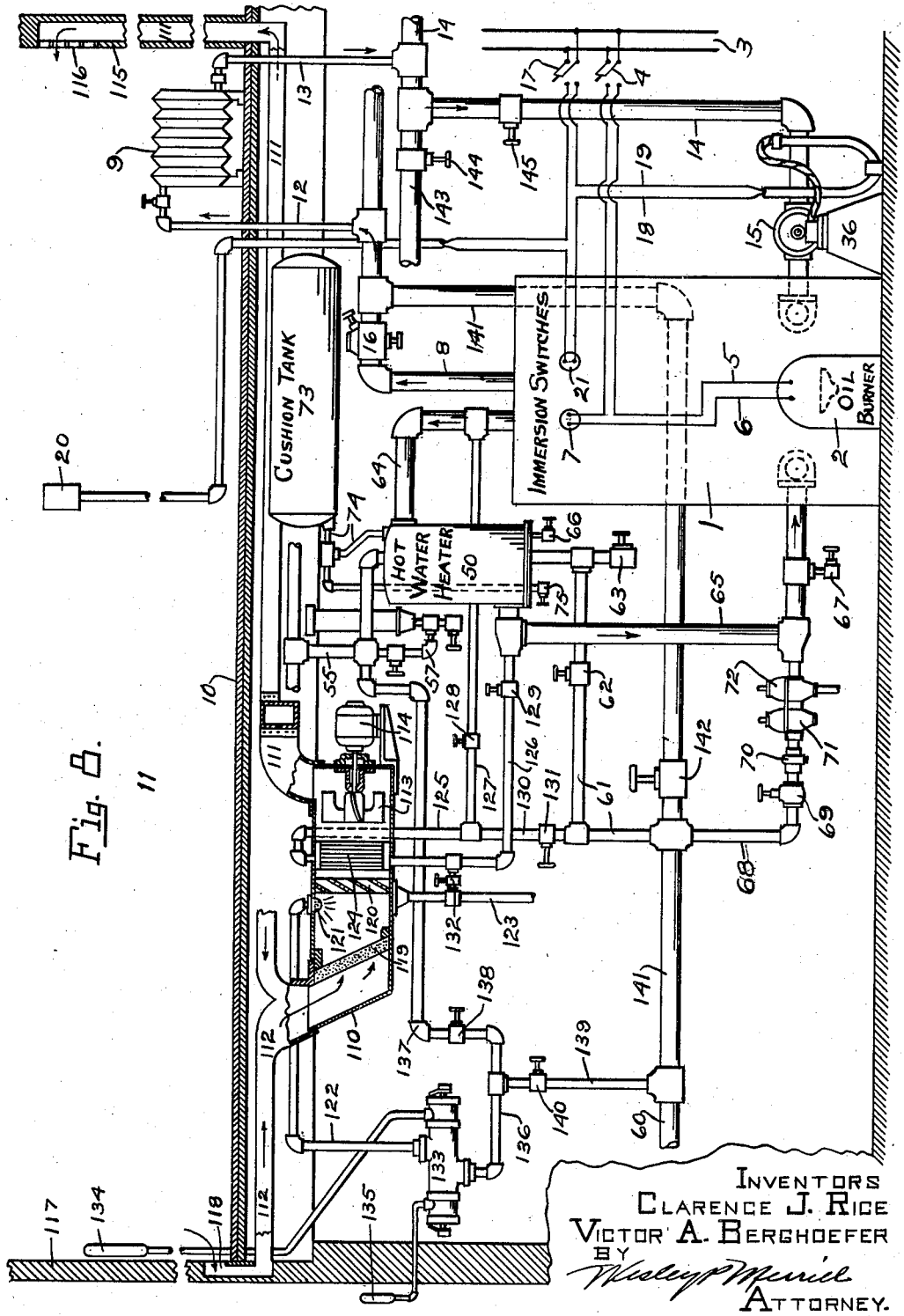
INVENTORS
CLARENCE J. RICE
VICTOR A. BERGHOEFER
BY Wesley Merrill
ATTORNEY.

Patented Aug. 22, 1939

2,170,507

UNITED STATES PATENT OFFICE 2,170,507

HEATING SYSTEM

Clarence J. Rice and Victor A. Berghoefer, Milwaukee, Wis., assignors to Sterling Engineering Company, Milwaukee, Wis., a corporation of Wisconsin Application May 3, 1935, Serial No. 19,678

5 Claims. (Cl. 237—19)

This invention relates to heating systems of the type in which a fluid heating medium is employed for heating an enclosed space and also for heating water for domestic use.

Heating systems have heretofore been provided in which a heating coil is arranged in a domestic hot water storage tank and supplied with heating fluid from the same boiler which supplies heating fluid to space heating radiators. One objection to such a system is that the volume of hot water available at any given time is limited by the capacity of the tank. Another objection is that a considerable period of time is required to heat a tankful of water. Another objection is that the temperature of the water in the tank cannot be kept high enough for laundry and other purposes when the demand for hot water is heavy, such as when several tenants of an apartment building are simultaneously using large quantities of hot water.

The present invention has as an object to provide a combined space and water heating system which will be free of the above objectionable characteristics.

Another object is to provide a combined space and water heating system which will supply hot water over a long period of time at rates in excess of requirements for domestic hot water.

Another object is to provide a combined space and water heating system which will operate efficiently at any season of the year.

Another object is to provide a combined space and water heating system which is fully automatic in operation.

Another object is to provide such a system with an instantaneous hot water heater.

Another object is to provide a system of the above character with means for controlling the humidity of the air in a space heated by the system.

Another object is to provide such a system with means for cooling during warm weather the space which is heated by the system during cold weather.

Other objects and advantages will appear from the description hereinafter given of several systems in which the invention is embodied.

According to the invention in its general aspect and as ordinarily embodied in practice, a space heating circuit and a water heating circuit are supplied with fluid heating medium from a single boiler which is fired by a burner under the control of thermostatic means responsive to boiler temperature, the flow of fluid through the space heating circuit is controlled by thermostatic means responsive to space temperature, and an instantaneous hot water heater is connected into the water heating circuit.

According to the invention in another aspect, the flow of fluid through the space heating circuit is controlled in part by thermostatic means responsive to space temperature and in part by thermostatic means responsive to boiler temperature.

According to the invention in another aspect, the system is provided with a water heater having a plurality of coils of small diameter tubing which are connected to a water system and heated by fluid supplied from the boiler.

According to the invention in another aspect, the heating fluid is urged through the space heating circuit by a power driven circulator which, when idle, does not prevent gravitational flow therethrough.

The invention is exemplified by the heating systems illustrated schematically in the accompanying drawings in which the views are as follows:

Fig. 1 is a schematic representation of a combined space and water heating system in which the invention is embodied, the system including a boiler which is fired by an oil burner.

Fig. 2 is a central horizontal section through a circulator which circulates liquid through the space heating circuit.

Fig. 3 is a sectional plan view of the hot water heater shown in Fig. 1, the view being taken on the line 3—3 of Fig. 4.

Fig. 4 is a vertical section through the hot water heater taken on the line 4—4 of Fig. 3, the central part of the heater being broken away.

Fig. 5 is a central longitudinal section through a check valve shown in Fig. 1.

Fig. 6 is a circuit diagram similar to Fig. 1 but showing a system provided with a stoker fired boiler and with a different arrangement of controls.

Fig. 7 is a view similar to Fig. 6 but showing a system provided with a hand fired boiler.

Fig. 8 is a diagrammatic view showing the system illustrated in Fig. 1 modified to either heat or cool a space and to condition the air therein.

Figures 1 to 5

For the purpose of illustration, the invention is shown embodied in a heating system employing water as the heat transmitting medium. Hot water is circulated through the system from and to a boiler 1 which may be of any suitable construction. The boiler is heated by heat supplied thereto from an automatic oil burner 2 which may also be of any suitable type. Since boilers and automatic oil burners are well known, and since no part of the present invention resides therein, it is deemed unnecessary to illustrate or describe the boiler 1 and the oil burner 2 in detail.

The burner 2 is operated by electric current supplied thereto from a power line 3 through a normally closed manually operated switch 4 and conductors 5 and 6. Operation of the burner 2 is controlled by a thermostatic immersion switch 7 which is connected in series with the burner and has a part thereof inserted through the casing of the boiler into contact with the water therein.

The switch 7, which may be of any suitable type, is adjusted to close the circuit and thereby start the burner in operation in response to the temperature of the water in the boiler falling below a predetermined degree and to open the circuit and thereby stop operation of the burner in response to the temperature of the water in the boiler exceeding a predetermined degree.

The temperature of the water in the boiler may thus be maintained within a narrow range as immersion switches in common use accurately respond to slight variations in temperature.

Heated water from the boiler 1 is supplied through a supply pipe 8 to space heaters such as the radiator 9 shown arranged upon the floor 10 of a room or space 11 which is to be heated.

The radiator 9 is supplied with hot water from the supply pipe 8 through a branch pipe 12 and it discharges cooled water through a discharge pipe 13 into a return pipe 14 which is connected to the boiler near the bottom thereof. The supply pipe 8, the return pipe 14 and the heaters connected therebetween constitute a space heating circuit.

It has heretofore been common practice to rely upon gravity for circulation of heating water through space heating circuits, and check valves have been installed in prior heating circuits to prevent reverse flow therein. In the system shown, the heating water is forced through the space heating circuit by an impeller or circulator 15 which may be connected into either side of the circuit but which is ordinarily connected into the return pipe 14. Reverse flow is prevented by a check valve 16 which may be connected into either side of the circuit but which is ordinarily connected into the supply pipe 8 and prevents any flow in the circuit when the circulator 15 is not in operation. The circulator 15 and the check valve 16 are shown more in detail in Figs. 2 and 5 and will be presently described.

The circulator 15 is operated by electric current supplied thereto from the power line 3 through a normally closed manually operated switch 17 and conductors 18 and 19.

Operation of the circulator is primarily controlled by a room thermostat or thermostatic switch 20 which is arranged in the space 11 and connected in series with the circulator 15. The thermostat 20 is adjusted to close the circuit and thereby start the circulator in operation whenever space temperature falls below a predetermined degree and to break the circuit to stop the circulator whenever space temperature exceeds a predetermined degree. The temperature of the space 11 is thus maintained within a given range by the thermostat 20 which may be of any suitable type.

The circulator 15 may be, but is not necessarily, further controlled by a normally closed thermostatic immersion switch 21 which may be of any suitable type and is connected in series with the circulator 15 and the thermostat 20. The immersion switch 21 has a part thereof inserted through the boiler casing into contact with the water in the boiler to enable the switch to respond to variations in boiler temperature.

The switch 21 remains closed unless boiler temperature drops below a predetermined degree, which is lower than the temperature at which the switch 7 closes, whereupon it will open and stop the circulator. When boiler temperature rises above that degree, the switch 21 will close and permit the thermostat 20 to have sole control of the circulator 15. With this arrangement, cold water is never discharged from the boiler into the space heating circuit and domestic hot water is made available within a very short time after the system is started in operation.

As shown in Fig. 2, the circulator 15 consists primarily of a casing 22, an impeller 23 arranged within the casing, and an electric motor 24 for driving the impeller. The casing 22 is connected into the return pipe 14 and contains an inlet chamber 25 and an outlet chamber 26 with which the two sections of the pipe 14 communicate respectively. The chambers 25 and 26 are separated from each other by a partition 27 which has a circular opening 28 formed therein in alinement with the shaft of the motor 24. The side of the casing 22 opposite the opening 28 is closed by a cap 29 having a packing gland 30 fixed thereto and extending into the casing.

The impeller 23 is arranged within the opening 28 and fixed upon a shaft 31 which extends outward through the gland 30. The shaft 31 is driven from the motor 24 through a helical driving spring 32 which has one of its ends connected to the shaft of the motor 24 by a collar 33 and its other end fastened to the shaft 31 by a collar 34.

The blades of the impeller 23 are so shaped that, when the motor 24 is energized and rotates the shaft 31 in a clockwise direction as viewed from the motor end thereof, the impeller 23 will draw water from the chamber 25 and force it into the chamber 26 and thence through the end section of the pipe 14 into the lower part of the boiler, thereby causing a positive circulation through the space heating circuit.

The motor 24 is supported upon and fixed to a bracket 35 which is shown as being carried by a pedestal 36 arranged upon the floor alongside the boiler. The bracket 35 is connected to the casing 22 as by means of bolts 37 and tubular separators 38, each bolt 37 extending through a separator 38 and clamping it firmly between the casing 22 and the bracket 35 to thereby securely fasten the casing to the bracket.

The arrangement is such that neither the shaft 31 nor the shaft of the motor 24 will be cramped due to slight misalinement of the shafts or due to movement of the casing 22 caused by expansion and contraction of the pipe 14.

The pressure created by the circulator 15 is ample to open the check valve 16 which has its casing 40 connected into the supply pipe 8. As shown in Fig. 5, the casing 40 is divided intermediate its ends by an inclined partition 41 having an opening 42 formed therein. The opening 42 is controlled by a clapper valve 43 which is hinged to the casing 40 and has sufficient weight to close the opening 42 and thereby prevent liquid from being circulated through the space heating circuit by gravity.

The check valve 16 is provided with a hand wheel 44 which may be manually rotated to advance a threaded stem 45 against the clapper valve 43 to hold it against its seat, and it is provided with a hand wheel 46 which may be manually rotated to advance a threaded stem 47 against the underside of the clapper valve 43 to hold it away from its seat.

Hot water for domestic use is supplied by an instantaneous hot water heater 50 which consists primarily of an outer shell or chamber 51 and a plurality of coils 52 of small diameter tubing arranged within the shell, as shown in Figs. 3 and 4.

The coils 52 have the upper and lower ends thereof connected, respectively, to connectors 53 and 54 which are fastened to the upper and lower ends of the shell 51 and form fluid tight joints therewith.

The upper connector has connected thereto a hot water pipe 55 through which hot water is supplied to various fixtures not shown. The pipe 55 is connected intermediate its ends to a cushion cylinder 56 by means of a pipe 57 having a shut-off valve 58 connected therein and a drain valve 59 connected thereto. The lower connector 54 is connected to a cold water supply pipe 60 by a pipe 61 having a shut-off valve 62 connected therein and a drain valve 63 connected thereto.

The heater 50 has its shell 51 connected at the upper end thereof to the upper part of the boiler 1 by a supply pipe 64 and at the lower end thereof to the lower part of the boiler by a return pipe 65, the shell 51 and the return pipe 65 being provided with drain valves 66 and 67 respectively.

The heater 50 is arranged high enough to cause hot water to flow by gravity from the boiler 1 through the pipe 64 and the shell 51 and to return to the boiler through the pipe 65, thereby heating the water in coils 52. When water is drawn from the pipe 55, as by opening a hot water faucet, cold water flows from the cold water supply pipe 60 through the pipe 61 and the coils 52 to the hot water pipe 55 and is instantly heated due to the fact that the coils 52 present a very large surface area to the hot water in the shell 51, the flow of hot water through the shell 51 from the boiler 1 being accelerated by the drop in temperature caused by the loss of the heat extracted from the water in the shell by the cold water flowing through the coils.

The return pipe 65 is connected to the cold water supply pipe 60 by a pipe 68 which ordinarily has a shutoff valve 69, a strainer 70, a pressure reducing valve 71 and a relief valve 72 connected therein. The shut-off valve 69 is normally closed but it may be opened manually to fill the system with water or to replenish the supply of water therein. The relief valve 72 prevents the fluid pressure in the system from exceeding a predetermined maximum.

Expansion of water in the system and variations in pressure being the predetermined maximum are compensated for by an expansion or cushion tank 73 which is arranged higher than the boiler and contains air to act as a cushion to the expanding water. The tank 73 is connected to the system in any suitable manner such as by means of a branched pipe 74 which connects the tank 73 to the top of the shell 51 of the water heater. The pipe 74 is ordinarily provided with a normally closed drain valve 75 which may be opened to drain water from the tank 73.

Assuming that the system is in operation, the burner 2 will function until the water in the boiler becomes hot enough to operate the immersion switch 7 which will then open the burner circuit and thereby keep the burner from operating until boiler temperature falls below a predetermined degree whereupon the switch 7 will close the burner circuit and cause the burner to function until the switch 7 is again operated in response to a high boiler temperature.

Water will flow from the boiler 1 through the shell 51 of the heater 50 at a relatively rapid rate until the coils 52 are heated and then it will flow slowly therethrough until hot water is drawn from the pipe 55 and causes cold water to enter the coils 52, whereupon the flow through the shell will be accelerated and the water will be heated as fast as it flows through the coils 52, thereby providing at all times an ample supply of hot water for domestic or other use.

If the water in the boiler is hot enough to close the immersion switch 21 and if the temperature in the space 11 is below a predetermined degree, the thermostat 20 will close and cause the circulator 15 to force hot water through the space heating circuit until the temperature in the space 11 becomes high enough to cause the thermostat 20 to open and stop the circulator 15, thereby permitting the check valve 16 to close and prevent any further flow through the space heating circuit while the circulator 15 is inoperative. The thermostat 20 operates in response to variations in temperature to start and stop the circulator 15 and thereby maintains the temperature of the space 11 within a predetermined range.

The immersion switch 7 continues to function to maintain boiler temperature within a predetermined range, but if for any reason boiled temperature should fall below a predetermined degree, the immersion switch 21 will function to prevent operation of the circulator 15 until boiler temperature exceeds that degree, thereby preventing cold or cool water from being circulated through the space heating circuit.

If the circulator 15 should become disabled or if gravity circulation should be desired for any other reason, the hand wheel 46 of check valve 16 may be operated to fix the clapper valve 43 in open position and thereby permit water to circulate through the space heating circuit by gravity.

It is often necessary to distribute the heating fluid to the several radiators through a plurality of supply pipes instead of through a single pipe 8 as shown, in which case, each supply pipe is provided with a check valve 16 and the stem 45 of each check valve is adjusted by turning the hand wheel 44 to limit the distance each clapper valve 43 may open and thereby divide the supply of heating fluid among the several supply pipes in the desired proportion. The hand wheel 44 of any check valve 16 may be turned until the stem 45 locks the clapper valve 43 to its seat and thereby prevent flow of heating fluid through the supply pipe in which that check valve is arranged.

During warm weather, the circulator 15 remains inoperative and the check valve 16 remains closed to prevent any circulation through the space heating circuit. The hot water heating circuit, however, remains in operation and continues to furnish an ample supply of hot water at all times regardless of whether or not the space heating circuit is in operation.

Figure 6

The heating system shown in this figure is substantially the same as the system shown in Fig. 1 except that the boiler is fired by a mechanical stoker. Consequently, parts which are like corresponding parts of the system shown in Fig. 1 have been indicated by like reference numerals and will not be further described.

The stoker, which is indicated in its entirety by the reference numeral 80, may be of any suitable type and has not been illustrated nor described in detail for the reason that stokers are well known and in common use. It is deemed sufficient to state that the stoker delivers coal from an outside source, such as a hopper 81 arranged above the stoker, into the firepot or burner 82 of the boiler in which the coal is burned.

The stoker is operated by electric current supplied thereto from the power line 3 through the switch 4 and the conductors 5 and 6, and it is controlled by the thermostatic immersion switch 7 which is connected in series therewith.

The immersion switch 7 is adjusted to close the circuit and thereby start the stoker in operation whenever boiler temperature drops below a predetermined minimum and to open the circuit and thereby stop operation of the stoker whenever boiler temperature reaches a predetermined maximum.

The stoker is thus operated and controlled in the same manner that the oil burner shown in Fig. 1 is operated and controlled, but the temperature of the water in the boiler cannot be as closely controlled under all conditions of operation in a boiler fired by a coal burner as it can in a boiler fired by an oil burner for the reason that application of heat to the boiler by an oil burner is discontinued immediately upon the oil burner ceasing to operate while heat from a coal fire continues to be applied to the boiler for a considerable time after a stoker ceases to operate or after coal has been fed to the burner by hand.

The temperature of the water in a boiler fired by a coal burner can be maintained within a given range without difficulty during cold weather as the space heating circuit is then in use. During warm weather, however, the space heating circuit is not in use and the additional heat applied to a coal fired boiler after the feeding of fuel to the burner ceases may be sufficient to raise boiler pressure above a safe limit.

In order to prevent boiler pressure from exceeding a safe limit, the circulator 15 may be controlled by a thermostatic immersion switch 83 in addition to being controlled by the room thermostat 20 and the immersion switch 21 which are connected in circuit in the manner previously described. That is, the circulator 15 is operated by electric current supplied from the power line 3 through the switch 17 and the conductors 18 and 19, and it is primarily controlled by the room thermostat 20 and secondarily controlled by the immersion switch 21, the switches 20 and 21 being connected in series with each other and the circulator.

The thermostatic immersion switch 83 is connected in parallel with the circulator 15 as by means of conductors 84 and 85 connecting it to the conductors 18 and 19 respectively. The switch 83 is adjusted to operate at a temperature considerably higher than the temperature at which the immersion switches 7 and 21 operate.

If boiler temperature should become excessive, with a resultant high pressure within the boiler, the switch 83 will close and cause the circulator 15 to force enough hot water from the boiler into the space heating circuit to reduce boiler temperature and thereby reduce boiler pressure to within safe limits. When boiler pressure has been reduced to within safe limits, the switch 83 will operate to stop the circulator.

The switch 83 is provided solely as a safety factor and need for it will seldom if ever arise and then only during warm weather when the system is employed solely for providing hot water for domestic use.

With the exception of the above, the system functions in the same manner as the system shown in Fig. 1.

Figure 7

The system shown in this figure differs from the system shown in Fig. 6 only in that the boiler is fired by hand and provided with suitable apparatus for controlling the burner. Consequently, like parts have been indicated by like reference numerals and no further description thereof will be given.

The boiler is provided with a grate 90 forming part of a fire pot or burner in which coal or other fuel is burned and to which coal or other fuel is fed by hand through a fire door 91. The burner is controlled by a damper 92 arranged in a door 93 which closes the entrance to the ash pit of the boiler.

The damper 92 is operated by a damper motor 94 which is arranged in a stationary position and connected to the damper 92 by a chain or other flexible connector 95 passing over pulleys 96 and 97 suspended from the floor 10.

The damper motor 94 is operated by electric current supplied thereto from the power line 3 through the switch 4 and a transformer 98 which is connected to the motor 94 and to the switch 4 by suitable conductors.

Operation of the motor 94 is controlled by a thermostatic immersion switch 99 which is connected to the motor 94 by a plurality of conductors 100 and has a part thereof inserted through the boiler casing and immersed in the water in the boiler.

The switch 99, which corresponds to the switch 7 of the systems previously described, responds to a predetermined minimum boiler temperature to cause the motor 94 to open the damper 92, and it responds to a predetermined maximum boiler temperature to cause the motor 94 to close the damper 92. Since motor controlled hand fired boilers are well known and in common use, no further description thereof is deemed necessary.

Assuming that the system is in operation, that the temperature of the water in the boiler exceeds a predetermined degree and that the temperature in the space 11 is below a predetermined degree, the system will function as follows:

Hot water will circulate by gravity through the hot water heater 50 and heat for domestic use the water in or flowing through the coils 52, the room thermostat 20 and the immersion switch 21 will be closed and the immersion switch 83 will be open, thereby causing the circulator 15 to force hot water through the space heating circuit to heat the space 11, and the immersion switch 99 will respond to variations in boiler temperature to cause the damper motor 94 to close the damper 92 when boiler temperature exceeds a predetermined degree and to open the damper 92 when boiler temperature drops below a predetermined degree.

When the temperature in the space 11 reaches a predetermined degree, the room thermostat 20 will open and stop the circulator 15, thereby permitting the check valve 16 to close and prevent heating water from flowing by gravity through the space heating circuit.

If boiler temperature should become too low, the immersion switch 21 would open and prevent the circulator 15 from circulating heating water through the space heating circuit until boiler temperature became high enough to cause the switch 21 to close.

If boiler temperature should become excessive, the immersion switch 83 would close and cause the circulator 15 to force hot water from the boiler into the space heating circuit regardless of whether the switches 20 and 21 were open or closed, as previously explained.

*Figure 8*

The system shown in this figure is the same as the system shown in Fig. 1 except that it has been provided with means for conditioning and cooling the air in the space 11. The system functions to heat the space 11 and to heat water for domestic use in exactly the same way that the system shown in Fig. 1 functions. Consequently, parts which are like or similar to the correponding parts of the system shown in Fig. 1 have been indicated by like reference numerals and no detailed description thereof will be given.

In order to condition the air in the space 11, the system is provided with a humidifier or air conditioner which has not been illustrated in detail as the present invention does not reside in the air conditioner per se.

The air conditioner is provided with a casing 110 which is shown suspended from the floor 10 and as having a discharge duct 111 connected to its discharge end and a return duct 112 connected to its inlet end. Air is forced through the casing 110 by a fan 113 which is arranged in the discharge end thereof and driven by an electric motor 114 supported in a stationary position outside the discharge end of the casing 110. The motor 114 is controlled in the customary manner by a humidostat (not shown) arranged in the space 11.

For the purpose of illustration, a branch of the discharge duct 111 is shown extending upward through a wall 115 of the space 11 and terminating in a grilled opening 116, and a branch of the return duct 112 is shown extending upward through a wall 117 of the space 11 and terminating in a grilled opening 118.

When the fan 113 is in operation, it circulates air at a predetermined rate from the space 11 through the opening 118, the return duct 112, the casing 110, the discharge duct 111 and the opening 116 to the space 11, the air being conditioned as it passes through the casing 110.

The casing 110 is provided near its inlet end with a filter 119 and near its center with a baffle 120, the space between the filter and the baffle forming a spray chamber to which atomized water may be supplied through a spray nozzle 121 arranged in the upper wall of the casing 110 and connected to a pipe 122 through which water may be supplied to the nozzle 121.

Water discharged through the nozzle 121 into the spray chamber in excess of the volume evaporated by the stream of air passing therethrough is drained therefrom through a drain pipe 123 connected to the bottom of the casing 110 between the filter 119 and the baffle 120.

The casing 110 is provided intermediate the baffle 120 and the fan 113 with a heat transfer unit 124 to which water is supplied through a pipe 125 and from which water is discharged through a pipe 126. Both the nozzle 121 and the heat transfer unit 124 may be supplied either with hot water or with cold water to thereby either heat or cool the air as will be presently explained.

In order that hot water may be circulated through the heat transfer unit 124, the pipes 125 and 126 are connected, respectively, to the upper and lower parts of the boiler 1 in any suitable manner. As shown, the pipe 125 is connected to the hot water supply pipe 64 through a pipe 127 having a manually operated shut off valve 128 connected therein and the pipe 126 is connected to the return pipe 65 and has a manually operated shut off valve 129 connected therein.

In order that cold water may be circulated through the heat transfer unit 124, the pipes 125 and 126 are connected, respectively, to a cold water supply and to a drain. As shown, the pipe 125 is connected to the cold water supply pipe 61 through a pipe 130 having a manually operated shut off valve 131 connected therein and the pipe 126 is connected to the drain pipe 123 through a manually operated shut off valve 132.

When valves 128 and 129 are open and valves 131 and 132 are closed, hot water may flow from the boiler 1 through pipes 64, 127 and 125, the heat transfer unit 124 and pipes 126 and 65 back to the boiler. When valves 131 and 132 are open and valves 128 and 129 are closed, cold water may flow from the supply pipe 61 through pipes 130 and 125, the heat transfer unit 124, pipe 126 and valve 132 to the drain pipe 123.

While it is desirable to maintain the moisture content of the air in the space 11 within a narrow range, for instance 50 to 55 percent relative humidity, frost will form upon the windows or other glazed openings during cold weather whenever outside temperature becomes low enough to cause the temperature of the glass to drop below the dew point of the air in contact with the glass.

If it is desired to prevent frosting of the windows or other glazed openings, the moisture content of the air in the space 11 may be varied in accordance with variations in outside temperature below a predetermined degree. This may be accomplished by controlling the delivery of hot water to the nozzle 121.

For the purpose of illustration, the pipe 122 is shown connected to the outlet of a thermostatic valve 133 which is fully illustrated and described in Patent No. 1,988,776. Since no part of the present invention resides in the valve per se, it is deemed sufficient to state that the flow of water through the valve is varied in accordance with variations in the difference between the pressures in two bulbs 134 and 135 which contain expansible fluid and are connected by suitable tubes to opposite ends of the valve casing.

The pressure in the larger bulb 134 tends to close the valve 133 but its action is opposed by the pressure in the smaller bulb 135 which tends to open the valve 133. The effective pressure of the fluid in each bulb may be regulated by an adjustment arranged upon that end of the valve casing to which that bulb is connected, and the valve may be adjusted to either remain open or to remain closed.

The large bulb 134 is arranged within the space 11 and, since the temperature in the space 11 is kept within a narrow range as previously explained in connection with the description of the system shown in Fig. 1, the pressure in the bulb 134 remains nearly constant and exerts a nearly constant force upon the mechanism of the valve 133.

The small bulb 135 is exposed to outside temperature, as by being arranged outside the building in which the heating system is installed. As outside temperature decreases, the fluid in the bulb 135 will contract and reduce the force exerted by it upon the mechanism of the valve 133, thereby permitting the nearly constant pressure in the bulb 134 to partially close the valve 133 to reduce the rate at which hot water is delivered to the nozzle 121.

The valve 133 can be so adjusted for cold weather operation that, when outside temperature drops below a predetermined degree, less water will be delivered to the nozzle 121 than could be evaporated by the air passing through the spray chamber. Then, any further drop in outside temperature will cause the delivery of water to the nozzle 121 to be further reduced and thereby reduce the moisture content of the air in the space 11 to such an extent that moisture will not condense upon the glazed openings.

The valve 133 may have either hot water or cold water supplied thereto through a pipe 136 which is connected to its inlet. Hot water may be supplied either from the boiler 1 or from the hot water heater 50, but, if the water were supplied from the boiler, the supply of water in the space heating circuit would be depleted. Also, the water in the boiler may become foul after the system has been in use for some time.

For the above reasons, the pipe 136 is shown connected to the domestic hot water supply pipe 55 through a pipe 137 having a manually operated shut off valve 138 connected therein. The pipe 136 is connected to the cold water supply pipe 60 through a pipe 139 having a manually operated shut off valve 140 connected therein.

During cold weather, the valve 140 is normally closed and the valve 138 is normally open to permit hot water to flow from the hot water heater 50 to the nozzle 121 to humidify the air passing through the humidifier to the space 11, the delivery of water being under the control of the valve 133. Also, the valves 131 and 132 are closed and the valves 128 and 129 are open to cause hot water to flow through the heat transfer unit 124 to heat the air passing through the casing 110.

During warm weather, the valves 128 and 138 are closed to prevent hot water from flowing through the heat transfer unit 124 and the nozzle 121. If it is desired to cool the air in the space 11 or if the humidity is high and it is desired to remove some of the moisture from the air in the space 11, the valves 131 and 132 are opened to permit cold water to flow through the heat transfer unit 124 and the valve 140 is opened to supply cold water to the nozzle 121.

The air passing through the casing 110 will be cooled by the spray of cold water introduced into the spray chamber, and it will be further cooled in passing over or through the heat transfer unit 124, thereby cooling the air in the space 11. If the air has a high moisture content, as is often the case in many sections of the country during warm weather, cooling the air as it passes through the spray of cold water will cause a part of the moisture content to be precipitated therefrom for the reason that the moisture carrying capacity of air decreases as its temperature decreases.

In order to further cool the air in the space 11, cold water may be circulated through the radiators of the space heating circuit. As shown, the cold water supply pipe 60 is connected by a pipe 141 to the supply pipe 8 at a point beyond the check valve 16 from the boiler, the pipe 141 having a shut off valve 142 connected therein, and the return pipe 14 is connected to a drain pipe 143 having a shut off valve 144 connected therein, the return pipe 14 being provided with a shut off valve 145 between its junction with the boiler and its junction with the drain pipe 143.

By closing valve 145 and opening valves 142 and 144, cold water may be circulated through the radiators 9 to cool during warm weather the space which is heated by the space heating circuit during cold weather, the check valve 16 remaining closed during this time as the circulator 15 is not in operation.

When valves 142 and 144 are closed and valve 145 is open, the system functions to heat the space 11 and to heat the water in or flowing through the coils 52 of the instantaneous hot water heater 50 as previously explained in connection with the description of the system shown in Fig. 1, and the water heated in the heater 50 may be used both for domestic use and for humidifying the air in the space heated by the space heating circuit.

It will be obvious that the apparatus for cooling and conditioning the air in the space 11 may be similarly applied to the heating systems shown in Figs. 6 and 7.

The invention herein set forth is susceptible of various modifications without departing from the scope thereof as hereafter claimed.

The invention is hereby claimed as follows:

1. A heating system, comprising a boiler, a burner for said boiler, a first thermostatic means for starting and stopping said burner in response to variations in boiler temperature below and above a predetermined degree, a space heating circuit connected to said boiler and supplied with heating fluid therefrom, a circulator for causing a forced circulation through said circuit, a check valve connected into said circuit for preventing flow therein when said circulator is not in operation, a second thermostatic means for starting and stopping said circulator in response to variations in space temperature below and above a predetermined degree, a third thermostatic means for stopping said circulator in response to boiler temperature falling to a predetermined low degree, and a fourth thermostatic means for starting said circulator in response to boiler temperature exceeding a predetermined high degree.

2. A heating system, comprising a boiler, a burner for said boiler, a first thermostatic means for starting and stopping said burner in response to variations in boiler temperature below and above a predetermined degree, a space heating circuit connected to said boiler and supplied with heating fluid therefrom, a circulator for causing a forced circulation through said circuit, a check valve connected into said circuit for preventing flow therein when said circulator is not in operation, a second thermostatic means for starting and stopping said circulator in response to variations in space temperature below and above a predetermined degree, a third thermostatic means for stopping said circulator in response to boiler temperature falling to a predetermined low degree, a fourth thermostatic means for starting said circulator in response to boiler temperature exceeding a predetermined high degree, said third thermostatic means being connected in series with said second thermostatic means and said fourth thermostatic means being connected in parallel with said second thermostatic means, an instantaneous water heater, and fluid channels connecting said water heater to said boiler and forming therewith a second circuit through which heating fluid may flow from said boiler to said water heater.

3. A heating system, comprising a boiler, a burner for said boiler, a first thermostatic means for starting and stopping said burner in response to variations in boiler temperature below and above a predetermined degree, a space heating circuit connected to said boiler and supplied with heating fluid therefrom, a circulator for causing a forced circulation through said circuit, a check valve connected into said circuit for preventing flow therein when said circulator is not in operation, a second thermostatic means for starting and stopping said circulator in response to variations in space temperature below and above a predetermined degree, a third thermostatic means for stopping said circulator in response to boiler temperature falling to a predetermined low degree, a fourth thermostatic means for starting said circulator in response to boiler temperature exceeding a predetermined high degree, said third thermostatic means being connected in series with said second thermostatic means and said fourth thermostatic means being connected in parallel with said second thermostatic means, a chamber, a set of water heating coils arranged in said chamber and having the inlet end thereof connected to a cold water pipe and the outlet end thereof to a domestic hot water supply pipe, said outlet end having no connection to said inlet end except through said coils, and fluid channels connecting said chamber to said boiler and forming therewith a second circuit through which heating fluid may flow from said boiler to said chamber to heat water flowing through said coils.

4. A system, for heating and conditioning the air in a space, comprising a heating circuit for heating said space, a boiler connected into said circuit for supplying heating fluid thereto, a burner for said boiler, a hot water heater, fluid channels connecting said water heater to said boiler and forming therewith a second circuit through which heating fluid may flow from said boiler to said water heater, an air conditioning apparatus having means for forcing air therethrough and into said space, means for supplying water from said hot water heater to said apparatus to vary the moisture content of the air forced therethrough, means for transmitting heating fluid from said boiler to said apparatus to heat the air forced therethrough and thereby supply heat to said space in addition to the heat supplied thereto by said heating circuit, and means responsive to variations in the difference between the temperature within said space and the temperature outside said space for controlling the delivery of water to said apparatus.

5. A system, for heating and conditioning the air in a space, comprising a heating circuit for heating said space, a boiler connected into said circuit for supplying heating fluid thereto, a burner for said boiler, a hot water heater, fluid channels connecting said water heater to said boiler and forming therewith a second circuit through which heating fluid may flow from said boiler to said water heater, an air conditioning apparatus having means for forcing air therethrough and into said space, means for supplying water from said hot water heater to said apparatus to vary the moisture content of the air forced therethrough, and means for transmitting heating fluid from said boiler to said apparatus to heat the air forced therethrough and thereby supply heat to said space in addition to the heat supplied thereto by said heating circuit.

CLARENCE J. RICE.
VICTOR A. BERGHOEFER.